US012615114B2

(12) United States Patent
Zheng et al.

(10) Patent No.: US 12,615,114 B2
(45) Date of Patent: Apr. 28, 2026

(54) REFERENCE SIGNAL RESOURCE CONFIGURATION METHOD AND APPARATUS, DEVICE, AND STORAGE MEDIUM

(71) Applicant: ZTE CORPORATION, Guangdong (CN)

(72) Inventors: Guozeng Zheng, Guangdong (CN); Chuangxin Jiang, Guangdong (CN); Huahua Xiao, Guangdong (CN); Bo Gao, Guangdong (CN); Cheng Bi, Guangdong (CN)

(73) Assignee: ZTE Corporation, Shenzhen (CN)

( * ) Notice: Subject to any disclaimer, the term of this patent is extended or adjusted under 35 U.S.C. 154(b) by 836 days.

(21) Appl. No.: 17/918,344

(22) PCT Filed: Apr. 9, 2021

(86) PCT No.: PCT/CN2021/086089
§ 371 (c)(1),
(2) Date: Oct. 12, 2022

(87) PCT Pub. No.: WO2021/208807
PCT Pub. Date: Oct. 21, 2021

(65) Prior Publication Data
US 2023/0146130 A1      May 11, 2023

(30) Foreign Application Priority Data
Apr. 13, 2020    (CN) .......................... 202010287751.1

(51) Int. Cl.
*H04L 5/00*        (2006.01)
*H04W 16/28*        (2009.01)
(Continued)

(52) U.S. Cl.
CPC ........... *H04L 5/0051* (2013.01); *H04W 16/28* (2013.01); *H04W 72/02* (2013.01); *H04W 72/0446* (2013.01); *H04W 72/0453* (2013.01)

(58) Field of Classification Search
CPC .... H04L 5/0051; H04W 16/28; H04W 72/02; H04W 72/0446; H04W 72/0453
See application file for complete search history.

(56) References Cited

U.S. PATENT DOCUMENTS

2010/0272022 A1*  10/2010  Iwai ........................ H04J 13/22
                                                              370/328
2014/0092827 A1     4/2014  Jongren et al.
                    (Continued)

FOREIGN PATENT DOCUMENTS

CN      109802792 A     5/2019
CN      110086582 A     8/2019
                    (Continued)

OTHER PUBLICATIONS

3GPP, "Technical Specification Group Radio Access Network; NR; Physical channels and modulation," TS 38.211, V16.1.0, Release 16 (Mar. 2020).
                    (Continued)

*Primary Examiner* — Faruk Hamza
*Assistant Examiner* — Tito Q Pham
(74) *Attorney, Agent, or Firm* — KDW Firm PLLC

(57) ABSTRACT

Provided are a reference signal resource configuration method and apparatus, a device, and a storage medium. The method includes: configuring a plurality of frequency domain units as a frequency domain unit set, where the frequency domain units are frequency domain resources of a preset frequency segment; configuring a reference signal resource pool corresponding to the frequency domain units, where the reference signal resource pool includes a plurality
(Continued)

of reference signal resources, and at least part of the reference signal resources have an association relationship established according to a preset rule or have an association relationship established according to an indication of an association relationship among the frequency domain units; and configuring a preset resource attribute for multiple reference signal resources having an association relationship. The accuracy of estimating a channel feature can be improved by using the reference signal resources for estimating the channel feature.

16 Claims, 2 Drawing Sheets

(51) Int. Cl.
H04W 72/02 (2009.01)
H04W 72/0446 (2023.01)
H04W 72/0453 (2023.01)

(56) References Cited

U.S. PATENT DOCUMENTS

| | | | |
|---|---|---|---|
| 2017/0201974 A1* | 7/2017 | Sohn | H04W 72/21 |
| 2019/0044775 A1 | 2/2019 | Zhang et al. | |
| 2019/0261336 A1 | 8/2019 | Liu et al. | |
| 2020/0028550 A1 | 1/2020 | Manolakos et al. | |
| 2021/0337563 A1* | 10/2021 | Huang | H04L 5/0094 |
| 2022/0263591 A1* | 8/2022 | Chen | H04W 24/10 |
| 2022/0330069 A1* | 10/2022 | Zhang | H04L 5/0051 |

FOREIGN PATENT DOCUMENTS

| | | |
|---|---|---|
| CN | 110401518 A | 11/2019 |
| CN | 111901874 A | 11/2020 |
| EP | 3119121 A1 | 1/2017 |
| EP | 3393073 A2 | 10/2018 |
| EP | 3393073 A3 | 1/2019 |
| JP | 2013537732 A | 10/2013 |
| JP | 2018186498 A | 11/2018 |
| KR | 20180118531 A | 10/2018 |
| WO | 2018127137 A1 | 7/2018 |
| WO | 2018127998 A1 | 7/2018 |
| WO | 2020001517 A1 | 1/2020 |

OTHER PUBLICATIONS

3GPP, "Technical Specification Group Radio Access Network; NR; Physical layer procedures for data," TS 38.214, V15.7.0, Release 15 (Sep. 2019).

Chinese Search Report in CN Application No. 202010287751.1, dated Feb. 8, 2025, 3 pages.

Chinese Office Action in CN Application No. 202010287751.1,I dated Feb. 13, 2025, 4 pages.

Korean Office Action in KR Application No. 10-2022-7038355, dated Jan. 31, 2025, 6 pages.

Japanese Office Action for Application No. 2022562593 dated Oct. 26, 2023.

International Search Report dated Jul. 9, 2021, for Application No. PCT/CN2021/086089 (four (4) pages).

OPPO, "Physical layer structure for NR-V2X", 3GPP TSG RAN WG1 #98bis, R1-1910372, Chongqing, China, Oct. 14-20, 2019.

Sequans Communications, "On NR sidelink physical layer structure", 3GPP TSG RAN WG1 Meeting #98bis, R1-1911306, Chongqing, China, Oct. 14-20, 2019.

ZTE et al., "On PRB Bundling," R1-1704396, 3GPP TSG RAN WG1 Meeting #88bis, Agenda Item 8.1.2.1.7: 4 pages (Apr. 3-7, 2017).

Extended European Search Report for EP Application No. 21789573.9, dated Apr. 10, 2024, 9 pages.

* cited by examiner

REFERENCE SIGNAL RESOURCE CONFIGURATION METHOD AND APPARATUS, DEVICE, AND STORAGE MEDIUM

CROSS-REFERENCE TO RELATED APPLICATIONS

This is a National Stage Application filed under 35 U.S.C. 371 based on International Patent Application No. PCT/CN2021/086089, filed on Apr. 9, 2021, which claims priority to Chinese Patent Application No. 202010287751.1 filed on Apr. 13, 2020, the disclosures of both of which are incorporated herein by reference in their entireties.

TECHNICAL FIELD

The present application relates to mobile communication technology and, in particular, to a reference signal resource configuration method and apparatus, a device, and a storage medium.

BACKGROUND

In general, the larger a signal bandwidth, the more accurate estimation of channel features of a receiver end. However, due to the effect of factors including terminal capability and interference coordination, continuous frequency domain units that can be used by a signal are limited, thereby affecting the accuracy of channel feature estimation. For example, a first path position is an important channel feature and plays an important role in signal synchronization and signal transmission time estimation. The accuracy of estimating the first path position depends largely on the bandwidth of a signal because the larger the bandwidth, the larger time resolution of sampling.

SUMMARY

The present application provides a reference signal resource configuration method and apparatus, a device, and a storage medium. Therefore, the accuracy of channel estimation is improved.

Embodiments of the present application provide a reference signal resource configuration method. The method includes the operations below.

A plurality of frequency domain units are configured as a frequency domain unit set. The frequency domain units are frequency domain resources of a preset frequency segment.

A reference signal resource pool is configured corresponding to the frequency domain units. The reference signal resource pool includes a plurality of reference signal resources. At least part of the reference signal resources have an association relationship established according to a preset rule or have an association relationship established according to an indication of an association relationship among the frequency domain units.

A preset resource attribute is configured for multiple reference signal resources having an association relationship.

Embodiments of the present application provide a reference signal resource configuration apparatus. The apparatus includes a frequency domain unit configuration module, a reference signal resource pool configuration module, and a resource attribute configuration module.

The frequency domain unit configuration module is configured to configure a plurality of frequency domain units as a frequency domain unit set. The frequency domain units are frequency domain resources of a preset frequency segment.

The reference signal resource pool configuration module is configured to configure a reference signal resource pool corresponding to the frequency domain units. The reference signal resource pool includes a plurality of reference signal resources. At least part of the reference signal resources have an association relationship established according to a preset rule or have an association relationship established according to an indication of an association relationship among the frequency domain units.

The resource attribute configuration module is configured to configure a preset resource attribute for multiple reference signal resources having an association relationship.

Embodiments of the present application provide a device. The device includes a memory and one or more processors.

The memory is configured to store one or more programs.

The one or more programs, when executed by the one or more processors, cause the one or more processors to perform any method provided in embodiments of the present application.

Embodiments of the present application provide a storage medium storing a computer program. When the computer program is executed by a processor, any method provided in embodiments of the present application is performed.

Reference signal resources having an association relationship provided in embodiments of the present application can be used for estimating the first path position of a channel, thereby improving the accuracy of estimating the first path position.

The preceding embodiments and other aspects of the present application and implementations thereof are described in more detail in the brief description of drawings, detailed description, and claims.

DETAILED DESCRIPTION

Embodiments of the present application will be described hereinafter in detail with reference to the drawings. The estimation of a first path position plays an important role in signal synchronization and signal transmission time estimation. In the related art, two directions are provided to improve the accuracy of estimating the first path position. In one direction, the estimation accuracy is improved through an algorithm at a receiving end. In the other direction, the estimation accuracy is improved by increasing the bandwidth of a signal. In the former method, the accuracy of finding the first path position can be improved, but temporal resolution cannot be improved since temporal resolution depends on the bandwidth of the signal. Therefore, in the latter method, temporal resolution is thus improved by increasing the bandwidth of the signal. However, due to the effect of factors including terminal capability and interference coordination, continuous frequency domain units that can be used by the signal are limited, thereby affecting the accuracy of estimating the first path position. The present application aims to provide frequency domain units having an association relationship. Such frequency domain units are used for jointly estimating a channel feature, thereby improving the accuracy of estimating the channel feature.

Figure 1:
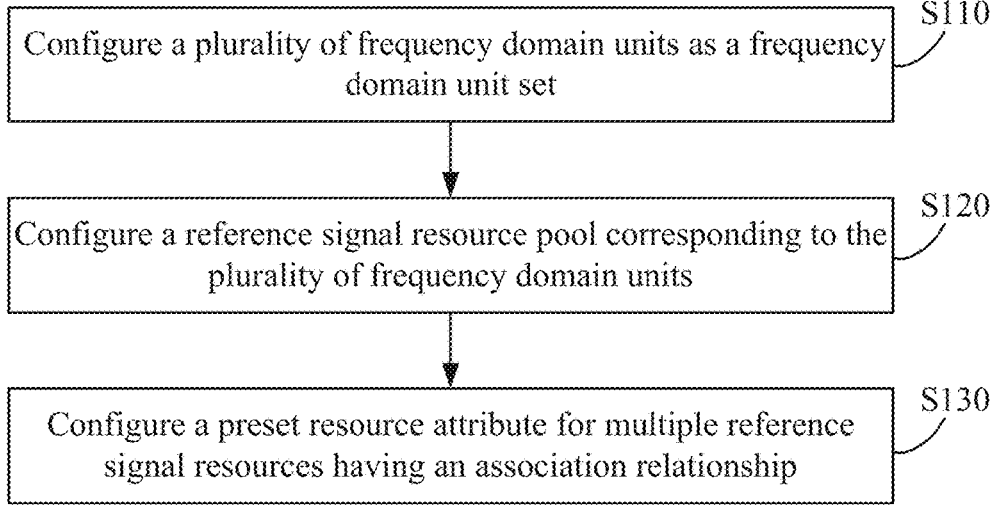
FIG. 1 is a flowchart of a reference signal resource configuration method according to embodiments of the present application.

In embodiments of the present application, FIG. 1 illustrates a flowchart of a reference signal resource configuration method. The method includes the operations below.

In S110, a plurality of frequency domain units are configured as a frequency domain unit set. The frequency domain units are frequency domain resources of a preset frequency segment.

In S120, a reference signal resource pool is configured corresponding to the frequency domain units. The reference signal resource pool includes a plurality of reference signal resources. At least part of the reference signal resources have an association relationship established according to a preset rule or have an association relationship established according to an indication of an association relationship among the frequency domain units.

In S130, a preset resource attribute is configured for multiple reference signal resources having an association relationship.

The frequency domain units are a segment of continuous frequency domain resources. These frequency domain units in the frequency domain unit set may be continuous or discontinuous in a frequency domain. An association relationship exists among the frequency domain units. The association relationship among the frequency domain units may indicate that two frequency domain units have an association relationship when the frequency domain unit set is configured. In this case, reference signal resources configured for the two frequency domain units have an association relationship. The association relationship among the frequency domain units may also be such that the frequency domain units corresponding to the reference signal resources having an association relationship are made to have an association relationship only after the reference signal resources configured in the frequency domain units have an association relationship. Moreover, if it indicates that two frequency domain units have an association relationship, the two frequency domain units may be configured with the same reference signal resource pool. Multiple reference signal resources having an association relationship need to have the same or corresponding attribute about some features, facilitating the estimation of a channel feature. A preset resource attribute of the reference signal resources having the association relationship may include at least one of a preset frequency domain feature, a preset time domain feature, a preset power feature, or a preset spatial feature or may include a related attribute of frequency band resources occupied by the reference signal resources.

After the association relationship between the reference signal resources is established, the reference signal resources having the association relationship may be used for jointly estimating a channel feature. For example, the estimation of a first path position may increase the bandwidth of a signal, thereby improving temporal resolution and thus improving the accuracy of estimating the first path position.

In an implementation, the operation in which the reference signal resource pool is configured corresponding to the frequency domain units includes the operations below.

Figure 2:
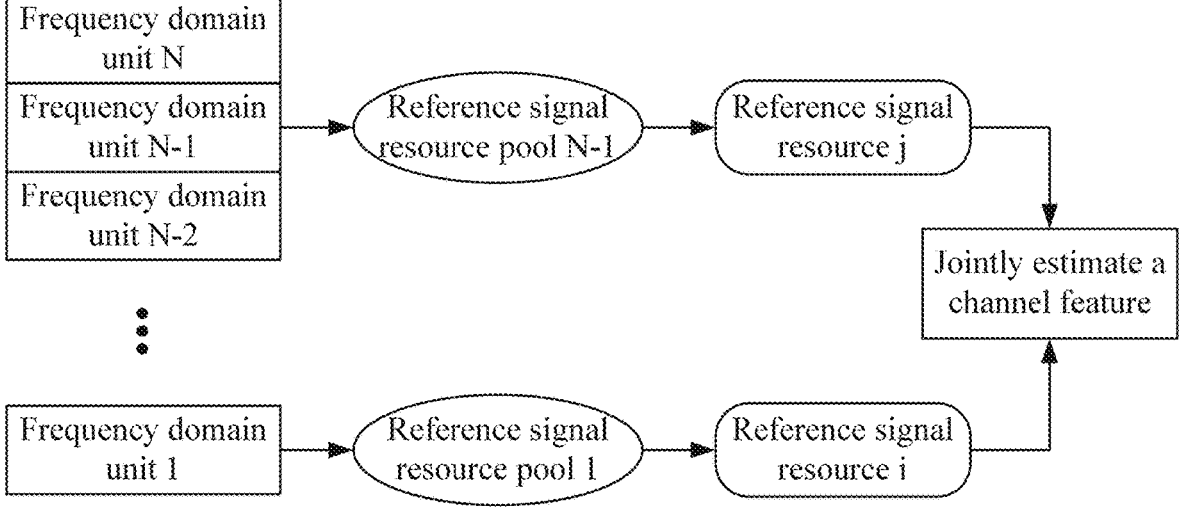
FIG. 2 is a diagram illustrating a framework of frequency domain units and reference signal resource pools according to embodiments of the present application.

One reference signal resource pool is configured corresponding to each frequency domain unit. Reference signal resource pools are configured to include a plurality of reference signal resources. Alternatively, a plurality of reference signal resource sets are included. The reference signal resource sets include a plurality of reference signal resources. A framework of the frequency domain units and the reference signal resource pools are shown in FIG. 2.

An association relationship between multiple reference signal resources belonging to different reference signal resource pools is determined through at least one of the manners below.

The association relationship is established through serial numbers of reference signal sets where the reference signal resources are located.

The association relationship is established through serial numbers of the reference signal resources.

The association relationship is established through the configuration information for determining the power control of the reference signal resources.

The association relationship is established through the configuration information for determining spatial filters of the reference signal resources or spatial relationships of the reference signal resources.

The reference signal resources having the association relationship need to belong to different reference signal resource pools, that is, be located in different frequency domain units. If the reference signal resource pools are configured to include a plurality of reference signal resources, an association relationship is established between multiple reference signal resources that have the same serial number and are in different reference signal resource pools. If the reference signal resource pools are configured to include a plurality of reference signal resource sets and the reference signal resource sets include a plurality of reference signal resources, an association relationship is established between multiple reference signal sets that have the same serial number and are in different reference signal resource pools. If, in different reference signal resource pools, an association relationship is established between multiple reference signal resources having the same configuration information for determining the power control of the reference signal resources, the configuration information for determining the power control may be used for determining the configuration information used for determining a path loss. Alternatively, in different reference signal resource pools, an association relationship is established between reference signal resources having the same configuration information for determining spatial filters of the reference signal resources or spatial relationships of the reference signal resources.

In this implementation, the operation in which the preset resource attribute is configured for the reference signal resources having the association relationship includes the operation below.

At least one of the following is configured for the reference signal resources having the association relationship: a preset frequency domain feature, a preset time domain feature, a preset power feature, or a preset spatial feature.

That the preset frequency domain feature is configured for the reference signal resources having the association relationship includes at least one of the manners below.

The starting position in a frequency domain of each reference signal resource is configured independently.

The bandwidth size of each reference signal resource is configured independently.

The comb configuration of each reference signal resource is configured independently.

The frequency offset of each reference signal resource in one resource block (RB) is configured independently.

That the preset time domain feature is configured for the reference signal resources having the association relationship includes at least one of the manners below.

It is configured that time domain behaviors of the reference signal resources having the association relationship are consistent with each other.

It is configured that a sending interval of the reference signal resources having the association relationship in the time domain is within preset time.

Configuring that the time domain behaviors of the reference signal resources having the association relationship are consistent with each other includes at least one of the manners below.

It is configured that the reference signal resources having the association relationship are sent periodically and are sent in a same period.

It is configured that the reference signal resources having the association relationship are sent semi-persistently and are sent in a same period.

It is configured that the reference signal resources having the association relationship are sent aperiodically.

Configuring that the sending interval of the reference signal resources having the association relationship in the time domain is within the preset time includes at least one of the manners below.

It is configured that the reference signal resources having the association relationship are sent in the same slot.

It is configured that a sending interval of the reference signal resources having the association relationship in the time domain is not greater than a preset time unit.

That the preset power feature is configured for the reference signal resources having the association relationship includes at least one of the manners below.

It is configured that the reference signal resources having the association relationship are associated with a same reference signal for calculating a path loss.

It is configured that for the reference signal resources having the association relationship, each resource element (RE) has the same sending power.

It is configured that the reference signal resources having the association relationship, as for any RE, a power sum of a plurality of symbols in one slot are the same.

It is configured that the reference signal resources having the association relationship perform dynamic power adjustment simultaneously.

That the preset spatial feature is configured for the reference signal resources having the association relationship includes at least one of the manners below.

It is configured that the reference signal resources having the association relationship are sent by using the same spatial filter or the same spatial relationship.

It is configured that the reference signal resources having the association relationship semi-statically or dynamically update the spatial filters or the spatial relationships simultaneously.

The reference signal resources having the association relationship configured based on the preceding method are able to be used for jointly estimating at least one of the following channel features: channel impulse response, reference signal receiving power (RSRP), reference signal receiving quality (RSRQ), first path position, reference signal time difference (RSTD), Rx-Tx time difference, delay spread, signal receiving angle, signal receiving angle spread, Doppler, and Doppler spread.

A base station may send the reference signal resources configured in the preceding implementation to a user terminal. The user terminal uses the reference signal resources to estimate a channel feature and feeds back the channel feature to an entity of a core network. A feedback operation of the user terminal includes at least one piece of the content below.

For the reference signal resources having the association relationship, only one channel impulse response needs to be fed back.

For the reference signal resources having the association relationship, only one piece of RSRP needs to be fed back.

For the reference signal resources having the association relationship, only one RSRQ needs to be fed back.

For the reference signal resources having the association relationship, only one first path position needs to be fed back.

When the reference signal resources having the association relationship are used for calculating a reference signal time difference, reference signals of the reference signal resources having the association relationship are equivalent to one reference signal. The reference signal time difference refers to a time difference between receiving two different reference signals.

When the reference signal resources having the association relationship are used for calculating an Rx-Tx time difference, reference signals of the reference signal resources having the association relationship are equivalent to one reference signal. The Rx-Tx time difference refers to a time difference between the moment of receiving a reference signal and the moment of sending another reference signal.

For the reference signal resources having the association relationship, only one delay spread needs to be fed back.

For the reference signal resources having the association relationship, only one signal receiving angle needs to be fed back.

For the reference signal resources having the association relationship, only one signal receiving angle spread needs to be fed back.

For the reference signal resources having the association relationship, only one piece of Doppler needs to be fed back.

For the reference signal resources having the association relationship, only one Doppler spread needs to be fed back.

The base station may send the reference signal resources configured in the preceding implementation to the user terminal. The user terminal sends the reference signal resources. The base station uses the reference signal resources to estimate a channel feature and feeds back the channel feature to another base station or an entity of the core network. A feedback operation of the base station includes at least one piece of the content below.

For the reference signal resources having the association relationship, only one channel impulse response needs to be fed back.

For the reference signal resources having the association relationship, only one piece of RSRP needs to be fed back.

For the reference signal resources having the association relationship, only one RSRQ needs to be fed back.

For the reference signal resources having the association relationship, only one first path position needs to be fed back.

When the reference signal resources having the association relationship are used for calculating a reference signal time difference, reference signals of the reference signal resources having the association relationship are equivalent to one reference signal. The reference signal time difference refers to a time difference between receiving two different reference signals.

When the reference signal resources having the association relationship are used for calculating an Rx-Tx time difference, reference signals of the reference signal resources having the association relationship are equivalent to one reference signal. The Rx-Tx time difference refers to a time difference between the moment of receiving a reference signal and the moment of sending another reference signal.

For the reference signal resources having the association relationship, only one delay spread needs to be fed back.

For the reference signal resources having the association relationship, only one signal receiving angle needs to be fed back.

For the reference signal resources having the association relationship, only one signal receiving angle spread needs to be fed back.

For the reference signal resources having the association relationship, only one piece of Doppler needs to be fed back.

For the reference signal resources having the association relationship, only one Doppler spread needs to be fed back.

In an implementation, the operation in which the reference signal resource pool is configured corresponding to the frequency domain units includes the operation below.

Figure 3:
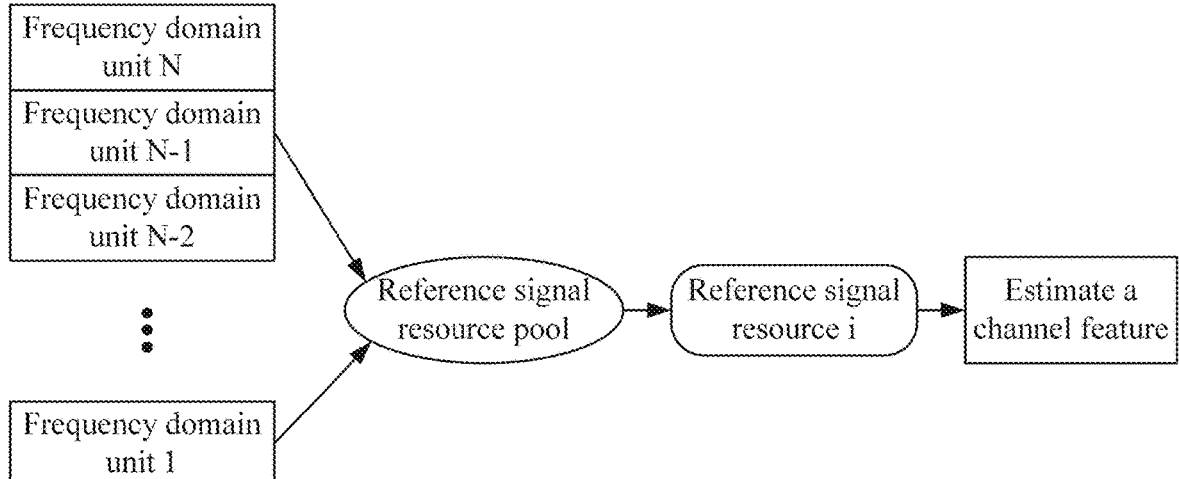
FIG. 3 is a diagram illustrating a framework of frequency domain units and a reference signal resource pool according to embodiments of the present application.

One reference signal resource pool is configured for all the frequency domain units. The reference signal resource pool includes a plurality of reference signal resources. A framework of the frequency domain units and the reference signal resource pool is shown in FIG. 3.

A frequency band resource occupied by each reference signal resource is configured through one of the manners below.

The frequency domain starting position of only one frequency band resource and a corresponding bandwidth size are configured.

The starting position of one frequency band resource and a corresponding bandwidth size are configured for each frequency domain unit having an association relationship.

In the case of configuring the frequency domain starting position of only one frequency band resource and the corresponding bandwidth size, a sequence for transmitting the reference signal resources includes at least one of the features below.

The sequence is a Zadoff-Chu (ZC) sequence. The length of the sequence may be determined according to at least one of a bandwidth size, a subcarrier spacing, or a comb configuration.

The sequence is a maximum-length linear shift register sequence (m sequence). The length of the sequence may be determined according to at least one of a bandwidth size, a subcarrier spacing, or a comb configuration.

It is configured in a frequency domain range included in the frequency band resource that part of the frequency domain resources do not transmit the sequence. Frequency domain units that are in the frequency band resource and transmit signals may be discontinuous. Accordingly, part of the frequency domain units have no signal transmission. Correspondingly, RBs corresponding to this part of the frequency domain units not transmitting signals are vacated.

In the case of configuring the starting position of one frequency band resource and the corresponding bandwidth size for each frequency domain unit having the association relationship, sequences for transmitting the reference signal resources includes at least one of the features below.

The sequences are a plurality of ZC sequences. The ZC sequences are in one-to-one correspondence with the frequency domain units having the association relationship. Moreover, each frequency domain unit can be configured with the cyclic shift amount of a sequence independently. The length of each ZC sequence may be determined according to at least one of the bandwidth size, subcarrier spacing or comb configuration configured for a corresponding frequency domain unit.

The sequences are a plurality of m sequences. The m sequences are in one-to-one correspondence with the frequency domain units having the association relationship. Moreover, each frequency domain unit can be configured with the initial seed of a sequence. The length of each m sequence may be determined according to at least one of the bandwidth size, subcarrier spacing or comb configuration configured for a corresponding frequency domain unit.

The frequency offset in one RB in each frequency domain unit is different.

The comb configuration in each frequency domain unit is different.

The subcarrier spacing in each frequency domain unit is different.

For the reference signal resources configured based on the preceding method, the frequency band resources include a plurality of frequency domain units. The reference signal resources are able to be used for jointly estimating at least one of the following channel features: channel impulse response, reference signal receiving power (RSRP), reference signal receiving quality (RSRQ), first path position, reference signal time difference (RSTD), Rx-Tx time difference, delay spread, signal receiving angle, signal receiving angle spread, Doppler, and Doppler spread.

The base station may send the reference signal resources configured in the preceding implementation to the user terminal. The user terminal uses the reference signal resources to estimate a channel feature and feeds back the channel feature to the base station or an entity of the core network.

The base station may send the reference signal resources configured in the preceding implementation to the user terminal. The user terminal sends the reference signal resources. The base station uses the reference signal resources to estimate a channel feature and feeds back the channel feature to another base station or an entity of the core network.

Figure 4:
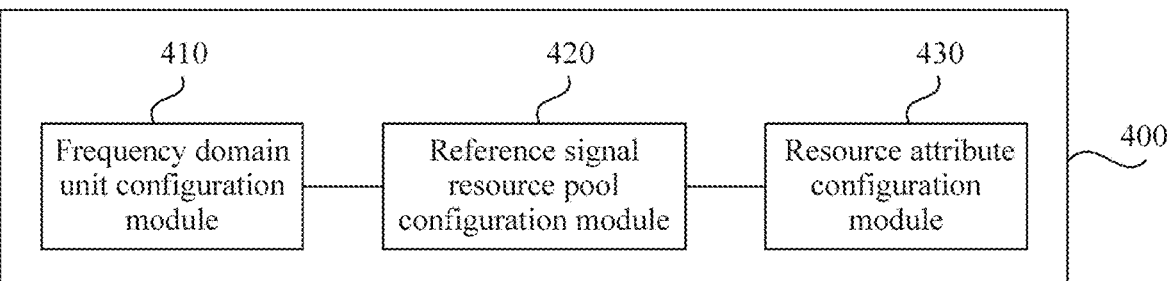
FIG. 4 is a diagram illustrating the structure of a reference signal resource configuration apparatus according to embodiments of the present application.

In embodiments of the present application, FIG. 4 is a diagram illustrating the structure of a reference signal resource configuration apparatus. The apparatus includes a frequency domain unit configuration module 410, a reference signal resource pool configuration module 420, and a resource attribute configuration module 430.

The frequency domain unit configuration module 410 is configured to configure a plurality of frequency domain units as a frequency domain unit set. The frequency domain units are frequency domain resources of a preset frequency segment.

The reference signal resource pool configuration module 420 is configured to configure a reference signal resource pool corresponding to the frequency domain units. The reference signal resource pool includes a plurality of reference signal resources. At least part of the reference signal resources have an association relationship established according to a preset rule or have an association relationship established according to an indication of an association relationship among the frequency domain units.

The resource attribute configuration module 430 is configured to configure a preset resource attribute for multiple reference signal resources having an association relationship.

In an implementation, the reference signal resource pool configuration module 420 is specifically configured to perform the operations below.

One reference signal resource pool is configured corresponding to each frequency domain unit. Reference signal resource pools are configured to include a plurality of reference signal resources. Alternatively, a plurality of reference signal resource sets are included. The reference signal resource sets include a plurality of reference signal resources.

An association relationship between multiple reference signal resources belonging to different reference signal resource pools is determined through at least one of the manners below.

The association relationship is established through serial numbers of reference signal sets where the reference signal resources are located.

The association relationship is established through serial numbers of the reference signal resources.

The association relationship is established through the configuration information for determining the power control of the reference signal resources.

The association relationship is established through the configuration information for determining spatial filters of the reference signal resources or spatial relationships of the reference signal resources.

In this implementation, the resource attribute configuration module 430 is configured to perform the operation below.

At least one of the following is configured for the reference signal resources having the association relationship: a preset frequency domain feature, a preset time domain feature, a preset power feature, or a preset spatial feature.

That the preset frequency domain feature is configured for the reference signal resources having the association relationship includes at least one of the manners below.

The starting position in a frequency domain of each reference signal resource is configured independently.

The bandwidth size of each reference signal resource is configured independently.

The comb configuration of each reference signal resource is configured independently.

The frequency offset of each reference signal resource in one resource block (RB) is configured independently.

That the preset time domain feature is configured for the reference signal resources having the association relationship includes at least one of the manners below.

It is configured that time domain behaviors of the reference signal resources having the association relationship are consistent with each other.

It is configured that a sending interval of the reference signal resources having the association relationship in the time domain is within preset time.

Configuring that the time domain behaviors of the reference signal resources having the association relationship are consistent with each other includes at least one of the manners below.

It is configured that the reference signal resources having the association relationship are sent periodically and are sent in a same period.

It is configured that the reference signal resources having the association relationship are sent semi-persistently and are sent in a same period.

It is configured that the reference signal resources having the association relationship are sent aperiodically.

Configuring that the sending interval of the reference signal resources having the association relationship in the time domain is within the preset time includes at least one of the manners below.

It is configured that the reference signal resources having the association relationship are sent in the same slot.

It is configured that a sending interval of the reference signal resources having the association relationship is not greater than a preset time unit.

That the preset power feature is configured for the reference signal resources having the association relationship includes at least one of the manners below.

It is configured that the reference signal resources having the association relationship are associated with a same reference signal for calculating a path loss.

It is configured that for the reference signal resources having the association relationship, each resource element (RE) has the same sending power.

It is configured that the reference signal resources having the association relationship, as for any RE, a power sum of a plurality of symbols in one slot are the same.

It is configured that the reference signal resources having the association relationship perform dynamic power adjustment simultaneously.

That the preset spatial feature is configured for the reference signal resources having the association relationship includes at least one of the manners below.

It is configured that the reference signal resources having the association relationship are sent by using the same spatial filter or the same spatial relationship.

It is configured that the reference signal resources having the association relationship semi-statically or dynamically update the spatial filters or the spatial relationships simultaneously.

In an implementation, the reference signal resource pool configuration module 420 is specifically configured to perform the operation below.

One reference signal resource pool is configured for all the frequency domain units. The reference signal resource pool includes a plurality of reference signal resources.

A frequency band resource occupied by each reference signal resource is configured through one of the manners below.

The frequency domain starting position of only one frequency band resource and a corresponding bandwidth size are configured.

The starting position of one frequency band resource and a corresponding bandwidth size are configured for each frequency domain unit having an association relationship.

In the case of configuring only the frequency domain starting position of one frequency band resource and the corresponding bandwidth size, a sequence for transmitting the reference signal resources includes at least one of the features below.

The sequence is a Zadoff-Chu (ZC) sequence. The length of the sequence is determined according to at least one of a bandwidth size, a subcarrier spacing, or a comb configuration.

The sequence is a maximum-length linear shift register sequence (m sequence). The length of the sequence is determined according to at least one of a bandwidth size, a subcarrier spacing, or a comb configuration.

In the case of configuring the starting position of one frequency band resource and the corresponding bandwidth size for each frequency domain unit having the association relationship, sequences for transmitting the reference signal resources includes at least one of the features below.

The sequences are a plurality of ZC sequences. The ZC sequences are in one-to-one correspondence with the frequency domain units having the association relationship. Moreover, each frequency domain unit can be configured with the cyclic shift amount of a sequence independently. The length of each ZC sequence may be determined according to at least one of the bandwidth size, subcarrier spacing or comb configuration configured for a corresponding frequency domain unit.

The sequences are a plurality of m sequences. The m sequences are in one-to-one correspondence with the frequency domain units having the association relationship. Moreover, each frequency domain unit can be configured with the initial seed of a sequence. The length of each m sequence may be determined according to at least one of the bandwidth size, subcarrier spacing or comb configuration configured for a corresponding frequency domain unit.

The frequency offset in one RB in each frequency domain unit is different.

The comb configuration in each frequency domain unit is different.

The subcarrier spacing in each frequency domain unit is different.

Figure 5:
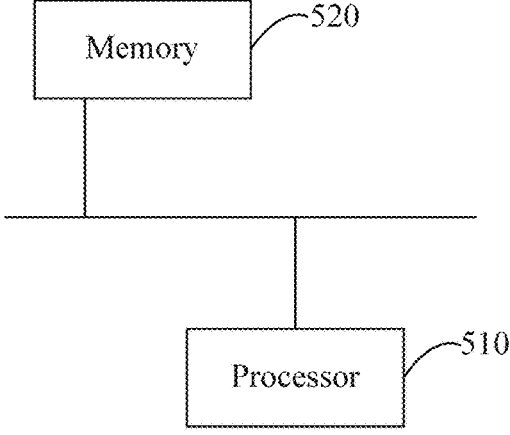
FIG. 5 is a diagram illustrating the structure of a device according to embodiments of the present application.

FIG. 5 is a diagram illustrating the structure of a device according to embodiments of the present application. As shown in FIG. 5, the device provided in the present application includes a processor 510 and a memory 520. One or more processors 510 may be included in the device.

One processor 510 is taken as an example in FIG. 5. One or more memories 520 may be included in the device. One memory 520 is taken as an example in FIG. 5. The processor 510 and memory 520 of the device are connected by a bus or in other manners. The connection by a bus is taken as an example in FIG. 5.

As a computer-readable storage medium, the memory 520 may be configured to store software programs, computer-executable programs, and modules, such as program instructions/modules (for example, the frequency domain unit configuration module, reference signal resource pool configuration module and resource attribute configuration module in the reference signal resource configuration apparatus) corresponding to the device according to any embodiment of the present application. The memory 520 may include a program storage region and a data storage region, where the program storage region may store an operating system and an application program required by at least one function, and the data storage region may store data created depending on the use of the device. Additionally, the memory 520 may include a high-speed random-access memory and may also include a nonvolatile memory, such as at least one disk memory, a flash memory, or another nonvolatile solid-state memory. In some examples, the memory 520 may further include memories located remotely relative to the processor 510, and these remote memories may be connected to the equipment via a network. Examples of the preceding network include, but are not limited to, the Internet, an intranet, a local area network, a mobile communication network, and a combination thereof.

The device provided above may be configured to perform the reference signal resource configuration method provided in any preceding embodiment and has corresponding functions and effects.

Embodiments of the present application further provide a storage medium including computer-executable instructions. When executed by a computer processor, the computer-executable instructions are used for performing the reference signal resource configuration method. The method includes that a plurality of frequency domain units are configured as a frequency domain unit set, where the frequency domain units are frequency domain resources of a preset frequency segment; that a reference signal resource pool is configured corresponding to the frequency domain units, where the reference signal resource pool includes a plurality of reference signal resources, and at least part of the reference signal resources have an association relationship established according to a preset rule or have an association relationship established according to an indication of an association relationship among the frequency domain units; and that a preset resource attribute is configured for multiple reference signal resources having an association relationship.

The preceding are only exemplary embodiments of the present application and are not intended to limit the scope of the present application.

It is to be understood by those skilled in the art that the term user terminal covers any suitable type of wireless user devices, for example, a mobile phone, a portable data processing apparatus, a portable web browser, or a vehicle-mounted mobile station.

In general, multiple embodiments of the present application may be implemented in hardware or special-purpose circuits, software, logic, or any combination thereof. For example, some aspects may be implemented in hardware while other aspects may be implemented in firmware or software that may be executed by a controller, a microprocessor, or another computing apparatus, though the present application is not limited thereto.

Embodiments of the present application may be implemented by computer program instructions executed by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions or may represent a combination of program steps with logic circuits, modules, and functions. A computer program may be stored in a memory. The memory may be of any type suitable for the local technical environment and may be implemented using any suitable data storage technology, such as, but not limited to, a read-only memory (ROM), a random-access memory (RAM) and an optical memory device and system (a digital versatile disc (DVD), or a compact disc (CD)).

Computer-readable media may include non-transitory storage media. Data processors may be of any type suitable for the local technical environment and may be, for example, but not limited to, a general-purpose computer, a special-purpose computer, a microprocessor, a digital signal processor (DSP), an application-specific integrated circuit (ASIC), a field programmable gate array (FPGA), and a processor based on multi-core processor architecture.

What is claimed is:

1. A reference signal resource configuration method, comprising:

configuring a plurality of frequency domain units as a frequency domain unit set, wherein the plurality of frequency domain units are frequency domain resources of a preset frequency segment;

configuring a reference signal resource pool corresponding to the plurality of frequency domain units, wherein the reference signal resource pool corresponding to the plurality of frequency domain units comprises a plurality of reference signal resources, and at least part of the plurality of reference signal resources have an association relationship established according to a preset rule or have an association relationship established according to an indication of an association relationship among the plurality of frequency domain units; and configuring a preset resource attribute for the at least part of the plurality of reference signal resources having an association relationship, wherein configuring the reference signal resource pool corresponding to the plurality of frequency domain units comprises:

configuring a reference signal resource pool corresponding to each frequency domain unit among the plurality of frequency domain units, wherein the reference signal resource pool corresponding to each frequency domain unit is configured to comprise a plurality of reference signal resources; or comprising a plurality of reference signal resource sets, wherein the plurality of reference signal resource sets comprises the plurality of reference signal resources; and determining, through at least one of the following manners, an association relationship between multiple reference signal resources belonging to different reference signal resource pools, wherein the multiple reference signal resources are among the plurality of reference signal resources:

establishing the association relationship through serial numbers of reference signal sets where the multiple reference signal resources are located;

establishing the association relationship through serial numbers of the multiple reference signal resources;

establishing the association relationship through configuration information for determining power control of the multiple reference signal resources; or establishing the association relationship through configuration information for determining spatial filters of the multiple reference signal resources or spatial relationships of the multiple reference signal resources;

wherein configuring the preset resource attribute for the multiple reference signal resources having the association relationship comprises configuring a preset frequency domain feature;

wherein configuring the preset frequency domain feature for the multiple reference signal resources having the association relationship is performed in at least one of the following manners:

configuring a starting position in a frequency domain of each reference signal resource among the multiple reference signal resources independently;

configuring a bandwidth size of each reference signal resource independently;

configuring a comb configuration of each reference signal resource independently; or configuring a frequency offset of each reference signal resource in one resource block (RB) independently.

2. The method according to claim 1, wherein configuring the preset resource attribute for the multiple reference signal resources having the association relationship further comprises:

configuring at least one of the following for the multiple reference signal resources having the association relationship: a preset time domain feature, a preset power feature, or a preset spatial feature.

3. The method according to claim 2, wherein configuring the preset time domain feature for the multiple reference signal resources having the association relationship is performed in at least one of the following manners:

configuring that time domain behaviors of the multiple reference signal resources having the association relationship are consistent with each other; or configuring that a sending interval among the multiple reference signal resources having the association relationship in a time domain is within a preset time unit.

4. The method according to claim 3, wherein configuring that the time domain behaviors of the multiple reference signal resources having the association relationship are consistent with each other is performed in at least one of the following manners:

configuring that the multiple reference signal resources having the association relationship are sent periodically and are sent in a same period;

configuring that the multiple reference signal resources having the association relationship are sent semi-persistently and are sent in a same period; or configuring that the multiple reference signal resources having the association relationship are sent aperiodically.

5. The method according to claim 3, wherein configuring that the sending interval among the multiple reference signal resources having the association relationship in the time domain is within the preset time unit is performed in at least one of the following manners:

configuring that the multiple reference signal resources having the association relationship are sent in a same slot; or configuring that a sending interval between a first sent reference signal resource and a last sent reference signal resource in a time domain is not greater than a preset time unit, wherein the first sent reference signal resource and the last sent reference signal resource are among the multiple reference signal resources having the association relationship.

6. The method according to claim 2, wherein configuring the preset power feature for the multiple reference signal resources having the association relationship is performed in at least one of the following manners:

configuring that the multiple reference signal resources having the association relationship are associated with a same reference signal for calculating a path loss;

configuring that for the multiple reference signal resources having the association relationship, each resource element (RE) has same sending power;

configuring that for the multiple reference signal resources having the association relationship, as for a RE, a power sum of a plurality of symbols in one slot are the same; or configuring that the multiple reference signal resources having the association relationship perform dynamic power adjustment simultaneously.

7. The method according to claim 2, wherein configuring the preset spatial feature for the multiple reference signal resources having the association relationship is performed in at least one of the following manners:

configuring that the multiple reference signal resources having the association relationship are sent by using a same spatial filter or a same spatial relationship; or configuring that the multiple reference signal resources having the association relationship semi-statically or dynamically update spatial filters or spatial relationships simultaneously.

8. The method according to claim 1, wherein configuring the reference signal resource pool corresponding to the plurality of frequency domain units comprises:

configuring the reference signal resource pool for all the plurality of frequency domain units, wherein the reference signal resource pool comprises a plurality of reference signal resources; and configuring a frequency band resource occupied by each reference signal resource among the plurality of reference signal resources through one of the following manners:

configuring a frequency domain starting position of and a corresponding bandwidth size of only one frequency band resource; or configuring a respective starting position of and a respective corresponding bandwidth size of a frequency band resource for each frequency domain unit of the at least part of the plurality of frequency domain units having an association relationship.

9. The method according to claim 8, wherein in a case of configuring the frequency domain starting position of and the corresponding bandwidth size of the only one frequency band resource, a sequence for transmitting the plurality of reference signal resources comprises at least one of the following features:

the sequence is a ZC sequence;

the sequence is an m sequence; or it is configured in a frequency domain range comprised in the only one frequency band resource that part of the frequency domain resources do not used for transmitting the sequence.

10. The method according to claim 8, wherein in a case of configuring the respective starting position of and the respective corresponding bandwidth size for each frequency domain unit of the at least part of the plurality of frequency domain units having an association relationship, sequences for transmitting the plurality of reference signal resources comprises at least one of the following features:

the sequences are a plurality of ZC sequences, wherein the plurality of ZC sequences are in one-to-one correspondence with the plurality of frequency domain units having the association relationship;

the sequences are a plurality of m sequences, wherein the plurality of m sequences are in one-to-one correspondence with the plurality of frequency domain units having the association relationship;

a frequency offset in one RB in each frequency domain unit is different;

a comb configuration in each frequency domain unit is different; or a subcarrier spacing in each frequency domain unit is different.

11. The method according to claim 1, wherein the multiple reference signal resources having the association relationship are configured to jointly estimate at least one of the following channel features:

a channel impulse response, reference signal receiving power, a reference signal receiving quality, a first path position, a reference signal time difference, an Rx-Tx time difference, a delay spread, a signal receiving angle, a signal receiving angle spread, Doppler, and a Doppler spread.

12. A non-transitory storage medium storing a computer program, wherein when the computer program is executed by a processor, the method according to claim 1 is performed.

13. A device, comprising a memory and at least one processor, wherein:

the memory is configured to store at least one program; and the at least one program, when executed by the at least one processor, causes the at least one processor to perform:

configuring a plurality of frequency domain units as a frequency domain unit set, wherein the plurality of frequency domain units are frequency domain resources of a preset frequency segment;

configuring a reference signal resource pool corresponding to the plurality of frequency domain units, wherein the reference signal resource pool corresponding to the plurality of frequency domain units comprises a plurality of reference signal resources, and at least part of the plurality of reference signal resources have an association relationship established according to a preset rule or have an association relationship established according to an indication of an association relationship among the plurality of frequency domain units; and configuring a preset resource attribute for the at least part of the plurality of reference signal resources having an association relationship, wherein configuring the reference signal resource pool corresponding to the plurality of frequency domain units comprises:

configuring a reference signal resource pool corresponding to each frequency domain unit among the plurality of frequency domain units, wherein the reference signal resource pool corresponding to each frequency domain unit is configured to comprise a plurality of reference signal resources; or comprising a plurality of reference signal resource sets, wherein the plurality of reference signal resource sets comprises the plurality of reference signal resources; and determining, through at least one of the following manners, an association relationship between multiple reference signal resources belonging to different reference signal resource pools, wherein the multiple reference signal resources are among the plurality of reference signal resources:

establishing the association relationship through serial numbers of reference signal sets where the multiple reference signal resources are located;

establishing the association relationship through serial numbers of the multiple reference signal resources;

establishing the association relationship through configuration information for determining power control of the multiple reference signal resources; or establishing the association relationship through configuration information for determining spatial filters of the multiple reference signal resources or spatial relationships of the multiple reference signal resources;

wherein configuring the preset resource attribute for the multiple reference signal resources having the association relationship comprises configuring a preset frequency domain feature;

wherein configuring the preset frequency domain feature for the multiple reference signal resources having the association relationship is performed in at least one of the following manners:

configuring a starting position in a frequency domain of each reference signal resource among the multiple reference signal resources independently;

configuring a bandwidth size of each reference signal resource independently;

configuring a comb configuration of each reference signal resource independently; or configuring a frequency offset of each reference signal resource in one resource block (RB) independently.

14. The device according to claim 13, wherein the at least one program, when executed by the at least one processor, causes the at least one processor to perform:

configuring at least one of the following for the multiple reference signal resources having the association relationship: a preset time domain feature, a preset power feature, or a preset spatial feature.

15. The device according to claim 14, wherein the at least one program, when executed by the at least one processor, causes the at least one processor to perform:

configuring that time domain behaviors of the multiple reference signal resources having the association relationship are consistent with each other; or configuring that a sending interval among the multiple reference signal resources having the association relationship in a time domain is within a preset time unit.

16. The device according to claim 15, wherein the at least one program, when executed by the at least one processor, causes the at least one processor to perform:

configuring that the multiple reference signal resources having the association relationship are sent periodically and are sent in a same period;

configuring that the multiple reference signal resources having the association relationship are sent semi-persistently and are sent in a same period; or configuring that the multiple reference signal resources having the association relationship are sent aperiodically.

* * * * *